(12) United States Patent
Moses

(10) Patent No.: US 7,066,535 B2
(45) Date of Patent: Jun. 27, 2006

(54) MULTI-PURPOSE SEAT PROTECTOR AND SEATBELT PROTECTOR

(76) Inventor: Phillip J. Moses, 1091 Galesmoor Ct., Westlake Village, CA (US) 91361

( * ) Notice: Subject to any disclaimer, the term of this patent is extended or adjusted under 35 U.S.C. 154(b) by 0 days.

(21) Appl. No.: 10/819,011

(22) Filed: Apr. 6, 2004

(65) Prior Publication Data
US 2005/0225135 A1    Oct. 13, 2005

(51) Int. Cl.
*A47C 27/00* (2006.01)
(52) U.S. Cl. .................. 297/229; 297/224; 297/219.1; 297/228.1; 297/228.12
(58) Field of Classification Search ............. 297/219.1, 297/220, 229, 224, 228.1, 228.12
See application file for complete search history.

(56) References Cited

U.S. PATENT DOCUMENTS

| | | | |
|---|---|---|---|
| 4,458,738 A | | 7/1984 | Wilson |
| 4,536,028 A | * | 8/1985 | Jones et al. .................. 297/224 |
| 4,676,376 A | | 6/1987 | Keiswetter |
| 4,694,511 A | | 9/1987 | Estes et al. |
| 5,005,901 A | | 4/1991 | Hinde |
| 5,275,463 A | * | 1/1994 | Rocha .......................... 297/229 |
| 5,709,431 A | | 1/1998 | Horn |
| 5,806,925 A | | 9/1998 | Hanley |
| 5,816,654 A | * | 10/1998 | Ellis .......................... 297/284.5 |
| 6,131,995 A | | 10/2000 | Smith |
| 6,309,017 B1 | | 10/2001 | Middleton |
| 6,447,059 B1 | * | 9/2002 | Jackson et al. ........ 297/228.12 |
| 6,481,793 B1 | | 11/2002 | Horn |
| 6,616,225 B1 | * | 9/2003 | Graff ........................... 297/229 |
| 6,626,491 B1 | * | 9/2003 | Blome et al. ................ 297/229 |
| 6,648,410 B1 | * | 11/2003 | Sparks ......................... 297/229 |
| 6,655,735 B1 | * | 12/2003 | Learning .................. 297/228.1 |
| 6,655,737 B1 | * | 12/2003 | Hyduk ......................... 297/229 |
| 6,761,404 B1 | * | 7/2004 | Parker et al. ............... 297/229 |

FOREIGN PATENT DOCUMENTS

| | | | |
|---|---|---|---|
| DE | 3419728 A1 | * | 11/1985 |
| EP | 458757 A2 | * | 11/1991 |
| EP | 634125 A1 | * | 1/1995 |

* cited by examiner

*Primary Examiner*—Laurie K. Cranmer
(74) *Attorney, Agent, or Firm*—Knobbe Martens Olson & Bear LLP

(57) ABSTRACT

A multi-purpose seat protector is provided for covering, for example, a weight bench and an automobile seat. The seat protector includes an envelope at a first end that receives an upper portion of the seat or bench, so that the protector does not slide off of the seat or bench. The seat protector prevents sweat from staining the surface that it covers. When the seat protector is removed from, for example an automobile seat, a person may safely sit upon the seat without staining his or her clothes. The seat protector also prevents excessive heat from a car seat from burning a person that sits upon the seat. When the seat protector covers a hot car set, a person may safely sit upon the seating surface without the seating surface burning his or her skin. A seatbelt protector is also provided for covering a seatbelt. The seatbelt protector prevents sweat from staining the seatbelt that it covers. When the seatbelt protector is removed from the seatbelt, a person may safely use the seatbelt without the seatbelt staining the person's clothes. Both the seat protector and the seatbelt protector are durable and washable.

10 Claims, 4 Drawing Sheets

MULTI-PURPOSE SEAT PROTECTOR AND SEATBELT PROTECTOR

BACKGROUND OF THE INVENTION

1. Field of the Invention

The present invention relates to covers for seating surfaces and for seatbelts. More particularly, the present multi-purpose seat protector provides a portable covering that is adaptable for use on a wide variety of surfaces upon which people sit or lie. The present seatbelt protector provides a portable covering that prevents seatbelt stains.

2. Description of the Related Art

Many people exercise at private health clubs or gyms. During their workout, many of these people sit or lie on specialized benches and/or seats. As a courtesy to other health club members, most people carry with them a towel that they place on each bench prior to sitting or lying down. The towel absorbs sweat from the person as he or she works out and keeps the bench clean and dry for the next person. Typically, a person's workout towel is about the same size as a typical bath towel. Thus, it is usually just large enough to cover the portion of the bench against which the person's torso rests. It is usually not large enough to cover the entire bench.

Many of the benches in health clubs and gyms include inclined or upright seatback portions. When a person places his or her workout towel on an inclined seatback, the towel tends to slide off the bench. Even if the person can get the towel to remain on the bench long enough for him or her to mount the bench, the towel usually slides off when the person rises between successive sets of a given exercise on the same bench. Thus, in between each set the person has to reposition the towel upon the bench. When a person places his or her workout towel on an upright seatback, the person has to drape it over the top of the seatback to keep it from sliding off the bench. The extra material that hangs over the back of the bench generally prevents the towel from covering the entire seatback, let alone the seat portion of the bench.

Many health club patrons leave the health club after a workout without showering or changing clothes. Many of these people drive their cars (or ride in another's car) from the gym to their next destination. Because they have not showered or changed clothes, many of these people transfer sweat from their skin and their workout clothes to their car seats and seatbelts. This sweat tends to stain the upholstery and the seatbelt. Many of these same people later sit on the same sweaty upholstery and fasten the same sweaty seatbelt after having changed into clean clothes. The sweat on the upholstery and/or the seatbelt tends to transfer to the person's clean clothes and leave unsightly stains.

Many people who participate in water sports, such as swimming and surfing, drive their cars (or ride in another's car) shortly after exiting the water and without changing into dry clothes. These people tend to transfer water to the upholstery and seatbelt. The water tends to stain the upholstery and the seatbelt. The staining is often worse when the water is salty or chlorinated. When someone wearing clean clothes later sits on the stained upholstery and fastens the stained seatbelt, the stains often transfer to the person's clean clothes.

Many people park their cars in direct sunlight. On a hot day, a car does not need to sit very long in the sun before the upholstery becomes too hot to touch, especially when the windows are rolled up. If a person returns to such a hot car wearing shorts, it can be impossible for the person to sit down on the hot upholstery without being burned on the back of his or her legs.

In order to protect their upholstery after a workout, or right after coming out of the water, or to protect their skin on a hot day, people might cover their car seat with a towel before they get into the car. However, the typical towel is too small to cover both the horizontal and vertical portions of the seat. Second, to cover the vertical portion of the seat the person must use friction between his or her back and the seat to keep the towel in place. The towel is not large enough to be draped over the headrest such that it hangs down and covers the entire seat. If the person leans forward, the towel falls and bunches up at the small of the person's back, which not only leaves the seatback uncovered, but can also be quite uncomfortable for the person.

Some people might use a larger towel that covers both the horizontal and vertical portions of the seat. Such a large towel can be draped over the headrest so that it will not fall down and bunch up when the person leans forward. However, when the towel is draped over the headrest, the loosely hanging corners of the towel tend to flap in the breeze that is created as the car is driven with the windows down. The flapping corners may hit the person in the side of the head, which is not only annoying but can also be a major distraction and lead to unsafe driving.

Protective coverings for automobile seating surfaces are well-known. For example, U.S. Pat. Nos. 4,676,376, 5,709, 431 and 6,481,793 all disclose protective automobile seat covers. Each of these covers, however, is constructed of plastic and is intended to be used only once or a few times and then disposed of. Thus, none of these covers are well adapted for use on surfaces other than vehicle seats, such as workout benches. Furthermore, none of these covers is adapted to provide insulation between an extremely hot car seat and a person's bare skin. A protective seat covering that is versatile enough to be used both to cover a workout bench and a vehicle seat, durable enough to be used, washed and reused many times, and insulating enough to be useful on hot days would be of great benefit to a wide variety of people.

At least one seatbelt sleeve is currently available to consumers. Allison Corp. of Livingston, N.J. distributes a "seat belt comforter" under the trademark AutoLogix™. This seat belt comforter provides a soft, cushioned surface to bear against the seatbelt wearer. The comforter is designed to increase the wearer's comfort and reduce chafing. The comforter is constructed of a material that is not particularly absorbent. Therefore, it is not particularly effective at preventing sweat from transferring from the wearer to the seatbelt. A protective seatbelt covering that is absorbent and durable enough to be used, washed and reused many times would be of great benefit to people who, for example, work out regularly, or perspire excessively, or enjoy water sports.

SUMMARY OF THE INVENTION

The preferred embodiments of the present multi-purpose seat protector and seatbelt protector have several features, no single one of which is solely responsible for their desirable attributes. Without limiting the scope of these protectors as expressed by the claims that follow, their more prominent features will now be discussed briefly. After considering this discussion, and particularly after reading the section entitled "Detailed Description of the Preferred Embodiments," one will understand how the features of the preferred embodiments provide advantages, which include the versatility to be used to cover a wide variety of surfaces, and the durability to be used, washed and reused many times.

A preferred embodiment of the present multi-purpose seat protector comprises a first fabric sheet and a second fabric sheet secured at a first end of the first sheet. The first and second sheets define an envelope that is open along a first edge of the second sheet. A strip of material adjacent the first end of the first sheet preferably extends between second and third edges of the first and second sheets.

Another preferred embodiment of the present multi-purpose seat protector comprises, in combination, a multi-purpose seat protector and a weight bench. The multi-purpose seat protector comprises a first fabric sheet and a second fabric sheet secured at a first end of the first sheet. The first and second sheets define an envelope that is open along a first edge of the second sheet such that the envelope is adapted to enclose a first end of the weight bench as a portion of the remainder of the protector rests atop an upper surface of the weight bench.

A preferred embodiment of the present seatbelt protector comprises a length of fabric having a first surface, a first fastener portion secured to the first surface along a first edge thereof, and a second fastener portion secured to the first surface along a second edge thereof.

Another preferred embodiment of the present seatbelt protector comprises a length of fabric having a first surface and a second surface, a first fastener portion secured to the first surface along a first edge thereof, and a second fastener portion secured to the second surface along a second edge thereof.

BRIEF DESCRIPTION OF THE DRAWINGS

The preferred embodiments of the present multi-purpose seat protector and seatbelt protector, illustrating their features, will now be discussed in detail. These embodiments depict the novel and non-obvious seat protector and seatbelt protector shown in the accompanying drawings, which are for illustrative purposes only. These drawings include the following figures, in which like numerals indicate like parts.

DETAILED DESCRIPTION OF THE PREFERRED EMBODIMENTS

Figure 1:
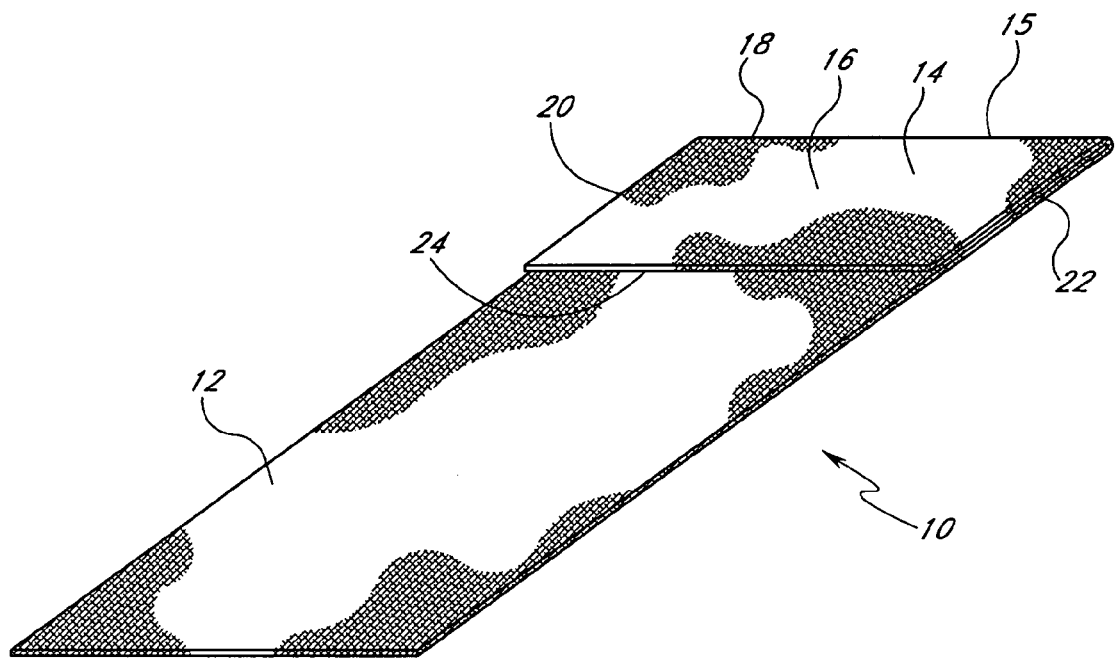
FIG. 1 is a perspective view of a preferred embodiment of the present multi-purpose seat protector.

FIG. 1 illustrates a preferred embodiment of the present multi-purpose seat protector 10. The protector 10 comprises a first fabric sheet 12 and a second fabric sheet 14 overlapping an upper portion of the first fabric sheet 12. The sheets 12, 14 are preferably rectangular, but could be any other suitable shape. The first and second sheets 12, 14 may be formed of a unitary length of fabric that is folded over on itself at one end. Alternatively, the first and second sheets 12, 14 may be formed of separate pieces of fabric.

The first and second sheets 12, 14 form an envelope 16 that is closed along a first side 18, a second side 20 and a third side 22. If the sheets 12, 14 are formed from a unitary piece of fabric, then the envelope 16 will necessarily be closed along the first side 18. If the sheets 12, 14 are formed from separate pieces of fabric, then the sheets 12, 14 are secured to one another along the first side 18 by any convenient means, such as stitching. The second and third sides 20, 22 of the envelope 16 are closed by any convenient means, such as stitching.

Figure 3:
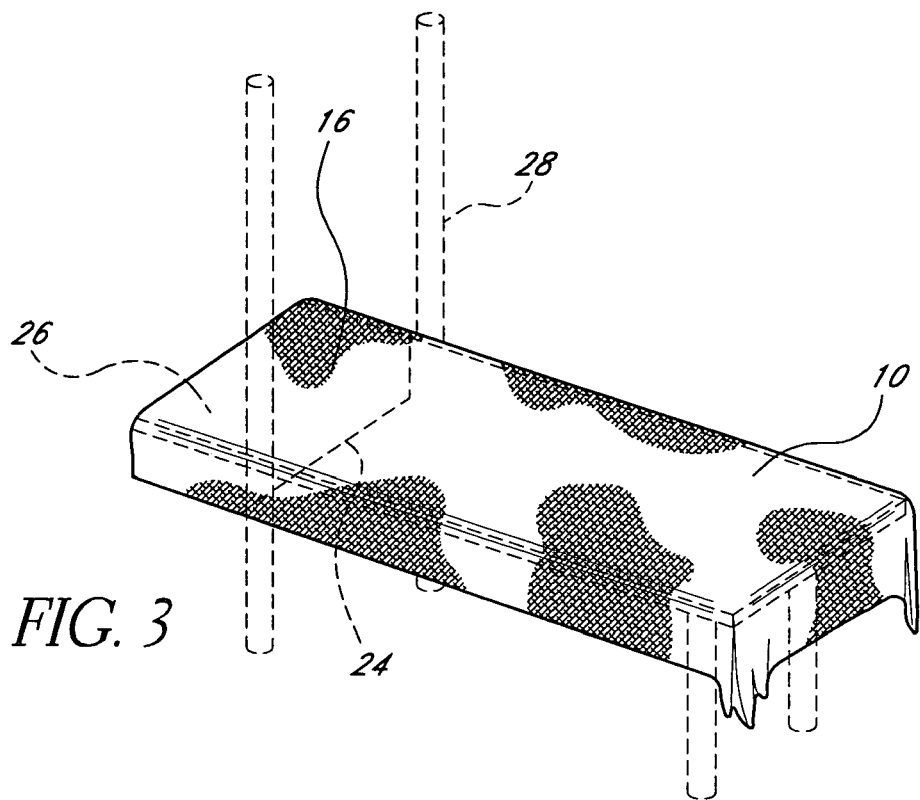
FIG. 3 is a perspective view of the multi-purpose seat protector of FIG. 1, illustrating the seat protector draped over a weight bench.
Figure 4:
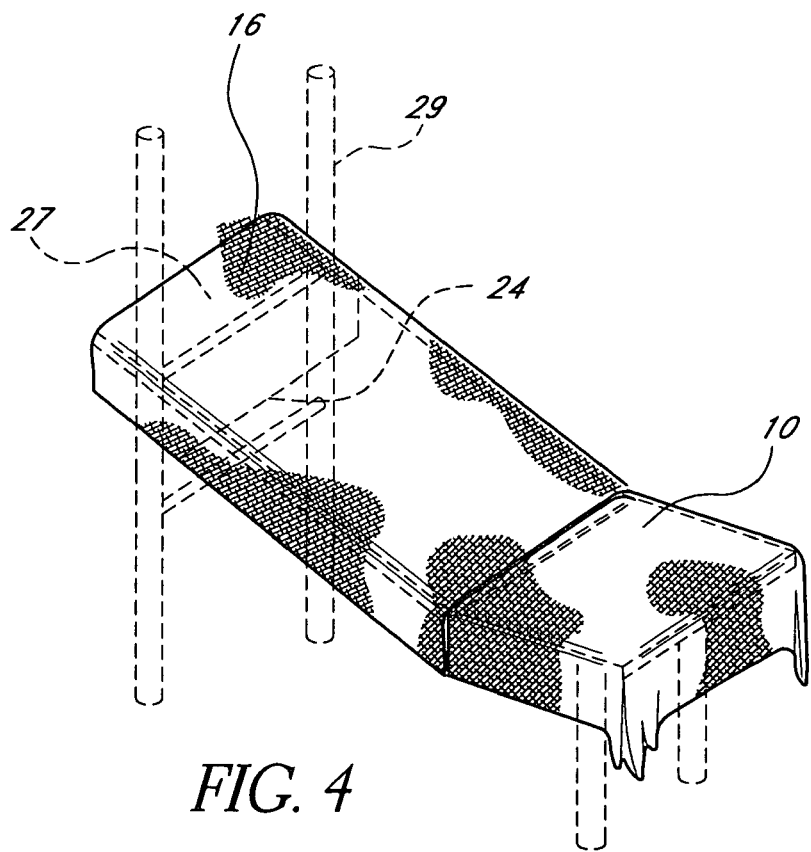
FIG. 4 is a perspective view of the multi-purpose seat protector of FIG. 1, illustrating the seat protector draped over a weight bench having an inclined seatback.

A fourth edge 24 of the second sheet 14 is not secured to the first sheet 12, thus providing an opening for the envelope 16. The envelope 16 is thus adapted to fit over a first end of various seating surfaces. For example, the envelope 16 encloses the first end 26 of a flat weight bench 28, as shown in FIG. 3. The envelope 16 also encloses the first end 27 of an inclined weight bench 29, as shown in FIG. 4. By enclosing the ends 26, 27 of the benches 28, 29, the envelope 16 secures the protector 10 to the benches 28, 29 so that it does not slide off, even when the exerciser rises off the bench between sets.

Figure 5:
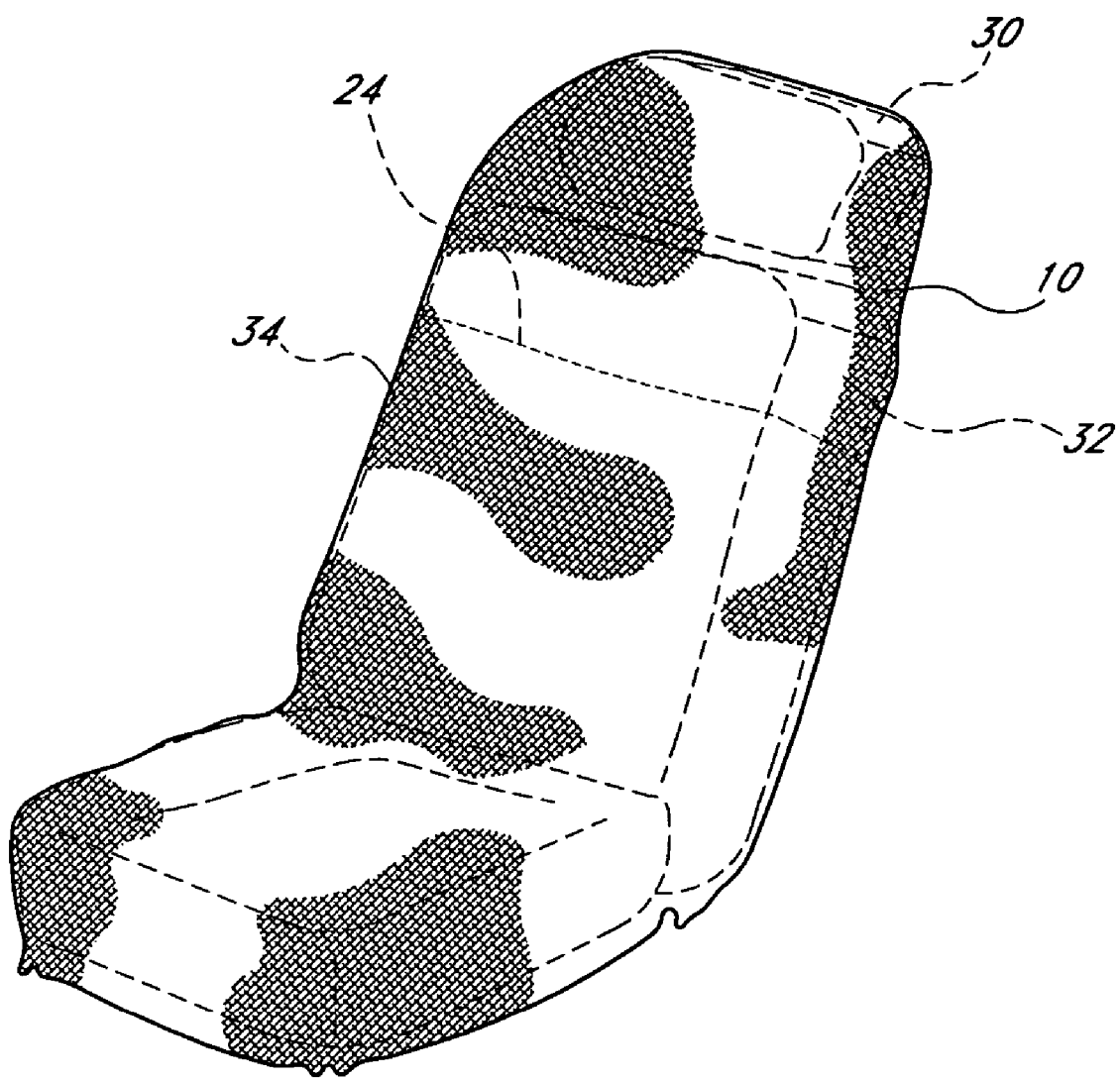
FIG. 5 is a perspective view of the multi-purpose seat protector of FIG. 1, illustrating the seat protector draped over an automobile seat.

The envelope 16 encloses the headrest 30 of a vehicle seat 34, as shown in FIG. 5. The envelope 16 may be large enough to also enclose an upper portion 32 of the vehicle seat 34. By enclosing the headrest 30 and possibly also the upper portion 32 of the vehicle seat 34, the envelope 16 secures the protector 10 to the seat 34 so that it does not slide down, even when the vehicle driver or passenger leans forward.

Although FIGS. 3 and 4 depict benches 28, 29 that are most commonly used during flat and inclined bench press exercises, respectively, those of skill in the art will appreciate that the present protector 10 is adapted for use with many other types of weight benches, seats and machines. The first fabric sheet 12 preferably has a sufficient length and width to cover the surfaces of whatever type of bench that the exerciser contacts. The sheet 12 thus absorbs sweat that emanates from all areas of the exerciser's body. The first fabric sheet 12 also preferably has a sufficient length and width to cover the horizontal and vertical portions of a typical vehicle seat. The sheet 12 thus protects the seat from fluids on a person that sits on the seat, and also protects the person from the seat when the seat is very hot.

The fabric sheets 12, 14 are preferably constructed of a fabric that is moisture absorbent, durable and capable of providing an insulation layer between a person's bare skin and a very hot vehicle seat. The protector 10 is preferably able to withstand repeated machine washings, so that the user can wash and reuse the protector 10 many times. Preferred fabrics include cotton and terry cloth. For example, the protector 10 may be formed of an ordinary household bath towel (having the desired dimensions) that is folded at one end and secured to itself as described above. Alternatively, the protector 10 may be formed of an ordinary household bath towel and an ordinary household hand towel that is secured to the bath towel as described above.

Figure 2:
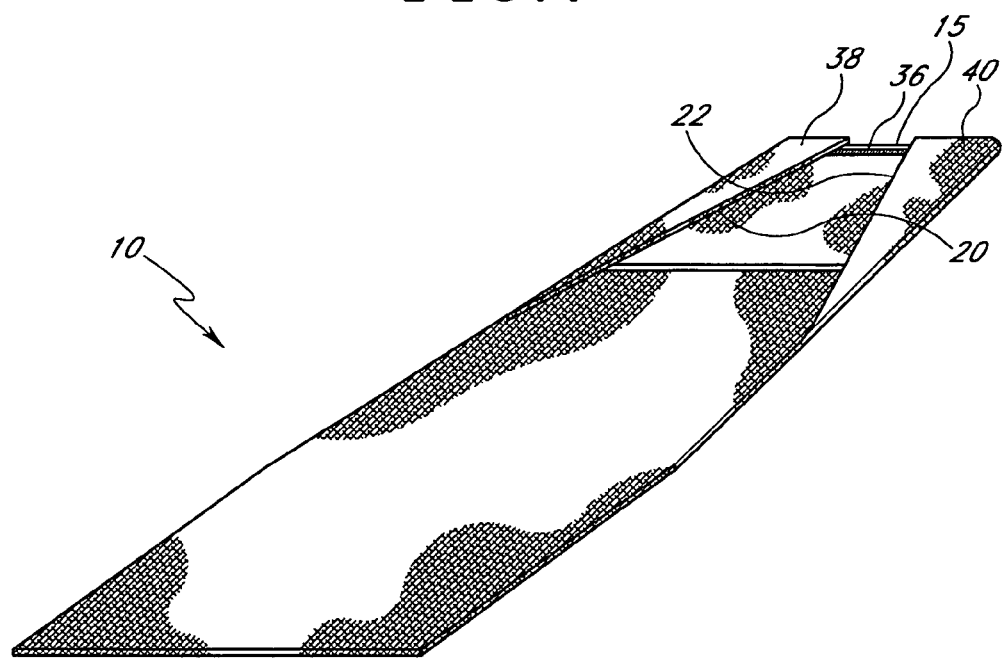
FIG. 2 is a perspective view of the multi-purpose seat protector of FIG. 1, including a strap member.

In a preferred embodiment, shown in FIG. 2, the second and third edges 20, 22 of the envelope 16 are preferably tethered to one another adjacent the first edge 18 of the envelope 16. A strip of material 36 preferably extends between the second and third edges 20, 22, and is secured thereto by any convenient means, such as stitching. The strip 36 is preferably short enough that the second and third edges 20, 22 must fold toward each other in order to be secured to the strip 36. The folded portions of the protector 10 comprise first and second flaps 38, 40, respectively. The strip 36 is preferably formed of an elastic material. The material is preferably durable enough to withstand repeated machine washings.

The strip 36 secures the flaps 38, 40 to one another, thereby restricting the range of motion of each flap 38, 40. When the user places the protector 10 over his or her car seat and drives with the windows down, incoming air causes the flaps 38, 40 to oscillate. If the flaps 38, 40 were not secured to one another with the strip 36, they may strike the driver on the side of his or her head. The repeated striking would not only annoy the driver, but would also distract him or her from his or her driving duties, which could lead to a collision or injury. The strip 36 thus safely secures the flaps 38, 40 behind the headrest 30 so that they do not interfere with the driver. The strip 36 may be secured at or near a first end 15 of the sheet 12.

To use the seat protector 10 at the gym, a user typically takes the protector 10 with him or her to the gym and places it over each seat or bench 28 that he or she uses as shown in FIG. 3. The protector 10 absorbs sweat and keeps each bench 28 clean and dry. The engagement of the envelope 16 and the end 26 of the weight bench 28 prevents the protector 10 from sliding off the bench 28 to either side. After working out, the user takes the protector 10 with him or her to the car and positions it over the seat 34 as shown in FIG. 4. Another user would similarly position the protector 10 over the seat 34 after exiting the water, or after arriving at the car on a hot day. The protector 10 prevents sweat and/or water from the user's skin and clothing from staining the seat 34. The protector 10 also prevents heat from the seat 34 from burning the user. When the user arrives at home, he or she removes the protector 10 from the seat 34, and may wash it so that it is ready for its next use. When the user next drives his or her car while wearing clean clothes, the lack of sweat and/or water on the upholstery prevents stains from forming on the user's clean clothes.

A preferred embodiment of the present seatbelt protector 50 is illustrated in FIG. 5. The protector 50 comprises a unitary length of fabric 52. The length of fabric 52 is preferably rectangular, but could be any other shape. Along a first surface 54 of the protector 50, first and second edges 56, 58 include fasteners 60. Those of skill in the art will appreciate that the fasteners 60 could be secured to opposite surfaces of the protector 50. For example, a first portion of the fastener 60 could be secured to the first surface 54 and a second portion of the fastener 60 could be secured to a second surface opposite the first surface 54.

In the illustrated embodiment, the fastener 60 comprises hook-and-loop material. Hook material is secured along one of the first and second edges 56, 58, and loop material is secured along the other. Those of skill in the art will appreciate that the fasteners need not be hook-and-loop material and could be, for example, buttons, snaps, a zipper or other means known to those of skill in the art.

The protector 50 is preferably constructed of a fabric that is moisture absorbent and durable. The protector also preferably provides an insulating layer between a hot seatbelt and a user. The protector 50 is preferably able to withstand repeated machine washings, so that the user can wash and reuse the protector 50 many times. Preferred fabrics include cotton and terry cloth. For example, the protector 50 may be formed of an ordinary household hand towel.

Figure 6:
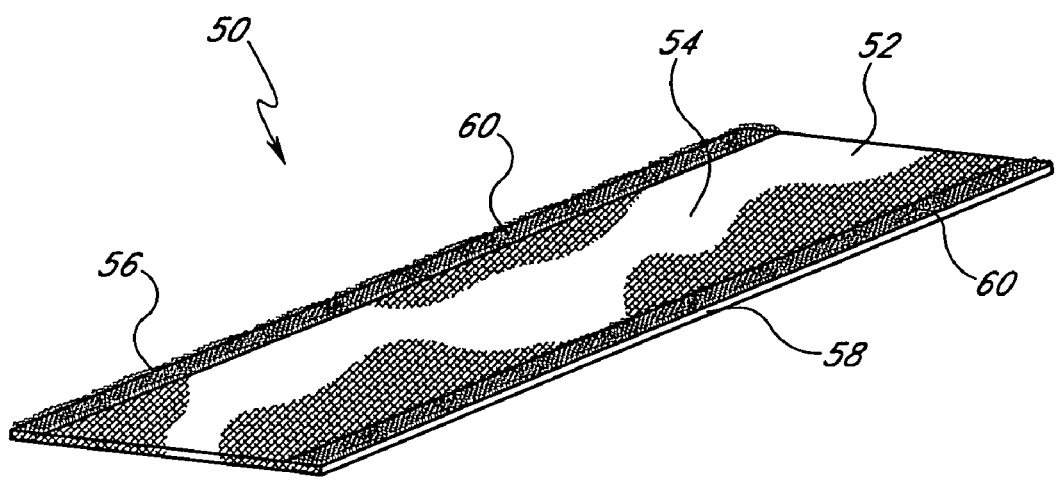
FIG. 6 is a perspective view of a preferred embodiment of the present seatbelt protector.
Figure 7:
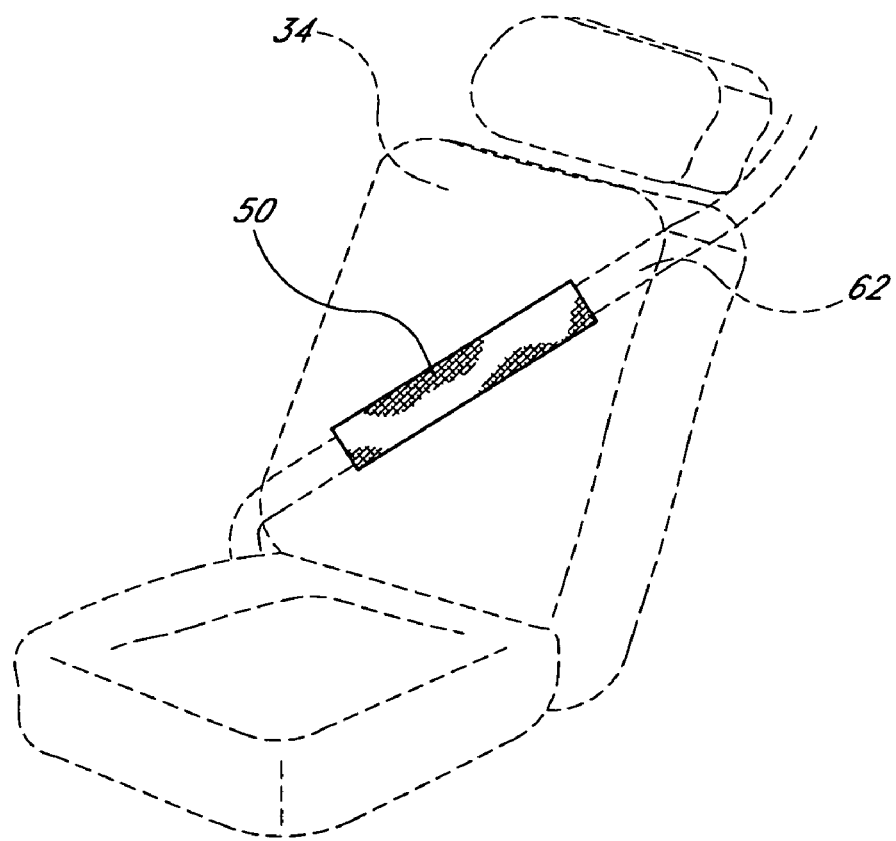
FIG. 7 is a perspective view of a the seatbelt protector of FIG. 1, illustrating the seatbelt protector disposed about a seatbelt.

The protector 50 folds along its longitudinal axis such that the fasteners 60 on the opposite edges 56, 58 engage one another. The protector 50 thus forms a flat sleeve that is well adapted to fit over a seatbelt 62, as shown in FIG. 6. A fastener (not shown), such as hook-and-loop material, may also removably secure the protector 50 to the seatbelt 62 to prevent the protector 50 from sliding relative to the seatbelt 62. For example, a strip of hook material could be secured to the seatbelt 62, and a mating strip of loop material could be secured to the protector 50. Engagement of the mating surfaces would positively secure the protector 50 in position relative to the seatbelt 62. Alternatively, friction may prevent the protector 50 from sliding relative to the seatbelt 62.

The user typically applies the protector 50 to the seatbelt 62 whenever he or she is dirty or has been sweating heavily, such as just after a workout. The user also typically applies the protector 50 to the seatbelt 62 whenever the seatbelt is hot. The protector 50 forms a barrier between the user and the seatbelt 62. The protector 50 absorbs sweat from the person, preventing the sweat from staining the seatbelt 62. The protector 50 also absorbs heat from the seatbelt, preventing the hot seatbelt from burning the person.

When the person later sits in his or her car seat 34 while wearing clean clothes, he or she first removes the protector 50 from the seatbelt 62 so that only the clean seatbelt 62 contacts the person's clean clothes. The clean seatbelt 62 does not stain the user's clean clothes. The user preferably washes the protector 50 periodically.

SCOPE OF THE INVENTION

The above presents a description of the best mode contemplated for carrying out the present multi-purpose seat protector and seatbelt protector, and of the manner and process of making and using them, in such full, clear, concise, and exact terms as to enable any person skilled in the art to which they pertain to make and use these protectors. These protectors are, however, susceptible to modifications and alternate constructions from those discussed above that are fully equivalent. Consequently, these protectors are not limited to the particular embodiments disclosed. On the contrary, these protectors cover all modifications and alternate constructions coming within the spirit and scope of these protectors as generally expressed by the following claims, which particularly point out and distinctly claim the subject matter of these protectors.

What is claimed is:

1. A multi-purpose seat protector, comprising:
   a first fabric sheet;
   a second fabric sheet secured at a first end of the first sheet, the second fabric sheet defining a smaller area than the first fabric sheet, the first and second sheets defining an envelope that is open along a first edge thereof; and
   a strip of material having a first end and a second end, the first end being secured to the envelope, and the second end being secured to the envelope;
   wherein the envelope includes a second edge that is spaced from and substantially parallel to the first edge, and the strip of material is located closer to the second edge than to the first edge.

2. The seat protector of claim 1, wherein the first and second sheets are secured to one another along the second edge of the envelope.

3. The seat protector of claim 2, wherein the first and second sheets are secured to one another along a third edge and a fourth edge of the envelope.

4. The seat protector of claim 2, wherein the first and second sheets comprise a unitary length of fabric that is folded over upon itself, and a location of the fold defines the second edge of the envelope.

5. The seat protector of claim 1, wherein the sheets are constructed of a fabric that is moisture absorbent and durable.

6. The seat protector of claim 5, wherein the sheets are constructed of cotton.

7. The seat protector of claim 5, wherein the sheets are constructed of terry cloth.

8. The seat protector of claim 1, wherein the strip of material is elastic.

9. The seat protector of claim 1, wherein the first end of the strip of material is secured to the envelope at a third edge thereof, and the second end of the strip of material is secured to the envelope at a fourth edge thereof that is opposite the third edge.

10. The seat protector of claim 9, wherein the strip of material extends in the direction of a width of the envelope, but is substantially shorter than the width of the envelope, such that the third and fourth edges of the envelope face each other and overlap the envelope when the seat protector rests on a flat surface.

* * * * *